US012627632B2

(12) United States Patent
Liu et al.

(10) Patent No.: US 12,627,632 B2
(45) Date of Patent: May 12, 2026

(54) MULTIPLE CONNECTIVITY MODES FOR CONTAINERIZED WORKLOADS IN A MULTI-TENANT NETWORK

(71) Applicant: VMware LLC, Palo Alto, CA (US)

(72) Inventors: Xiaopei Liu, Beijing (CN); Danting Liu, Beijing (CN); Jianjun Shen, Redwood City, CA (US); Qian Sun, Beijing (CN); Wenfeng Liu, Beijing (CN); Donghai Han, Beijing (CN)

(73) Assignee: VMware LLC, Palo Alto, CA (US)

( * ) Notice: Subject to any disclaimer, the term of this patent is extended or adjusted under 35 U.S.C. 154(b) by 1 day.

(21) Appl. No.: 18/121,548

(22) Filed: Mar. 14, 2023

(65) Prior Publication Data

US 2024/0314104 A1     Sep. 19, 2024

(51) Int. Cl.
| | |
|---|---|
| *G06F 15/16* | (2006.01) |
| *H04L 12/46* | (2006.01) |
| *H04L 61/2503* | (2022.01) |
| *H04L 61/5007* | (2022.01) |
| *H04L 101/668* | (2022.01) |

(52) U.S. Cl.
CPC ...... H04L 61/5007 (2022.05); H04L 12/4641 (2013.01); H04L 61/2503 (2013.01); *H04L 2101/668* (2022.05)

(58) Field of Classification Search
CPC ............. H04L 61/5007; H04L 12/4641; H04L 61/2503; H04L 2101/668
USPC .................................................. 709/245–246
See application file for complete search history.

(56) References Cited

U.S. PATENT DOCUMENTS

| | | | |
|---|---|---|---|
| 9,992,086 B1 * | 6/2018 | Mizik ................. | H04L 12/4641 |
| 11,843,517 B1 * | 12/2023 | Prateek .............. | H04L 12/4641 |
| 2018/0063193 A1 * | 3/2018 | Chandrashekhar ......................... G06F 11/2035 |
| 2019/0173757 A1 * | 6/2019 | Hira ................... | H04L 41/0895 |
| 2020/0067733 A1 * | 2/2020 | Hira ................... | H04L 12/4633 |
| 2020/0092138 A1 * | 3/2020 | Tillotson ............ | H04L 12/4633 |
| 2021/0311803 A1 * | 10/2021 | Zhou ................... | H04L 63/20 |
| 2022/0038311 A1 * | 2/2022 | Shen .................. | H04L 63/0263 |

OTHER PUBLICATIONS

Extended European Search Report, European Application No. 24158560.3 dated Nov. 4, 2024, 11 pages.

* cited by examiner

*Primary Examiner* — Bharat Barot
(74) *Attorney, Agent, or Firm* — King Intellectual Asset Management

(57) ABSTRACT

The disclosure provides a method for isolated environments for containerized workloads within a virtual private cloud in a networking environment. The method generally includes defining, by a user, a subnet custom resource object for creating a subnet in the virtual private cloud, wherein defining the subnet custom resource object comprises defining a connectivity mode for the subnet; deploying the subnet custom resource object such that the subnet is created in the virtual private cloud with the connectivity mode specified for the subnet; defining, by the user, a subnet port custom resource object for assigning a node to the subnet, wherein one or more containerized workloads are running on the node; and deploying the subnet port custom resource object such that the node is assigned to the subnet.

20 Claims, 7 Drawing Sheets

Data Center 101

Container Orchestrator 177

180

Host Cluster 110

Host 102(1)

VM(s) 104

Container 130

Application(s) 132

Container Eng. 136

Guest OS 134

VNIC(s) 140

Hypervisor 106(1)

Vport(s) 144

Virtual Switch 142

Vport(s) 146

Hardware 108(1)

Local Storage Resources 112

CPUs 116

RAM 118

PNICs 120

Host 102(2)

VM(s) 104

Container 130

Application(s) 132

Container Eng. 136

Guest OS 134

VNIC(s) 140

Hypervisor 106(2)

Vport(s) 144

Virtual Switch 142

Vport(s) 146

Hardware 108(2)

Local Storage Resources 112

CPUs 116

RAM 118

PNICs 120

Host 102(x)

VM(s) 104

Container 130

Application(s) 132

Container Eng. 136

Guest OS 134

VNIC(s) 140

Hypervisor 106(x)

Vport(s) 144

Virtual Switch 142

Vport(s) 146

Hardware 108(x)

Local Storage Resources 112

CPUs 116

RAM 118

PNICs 120

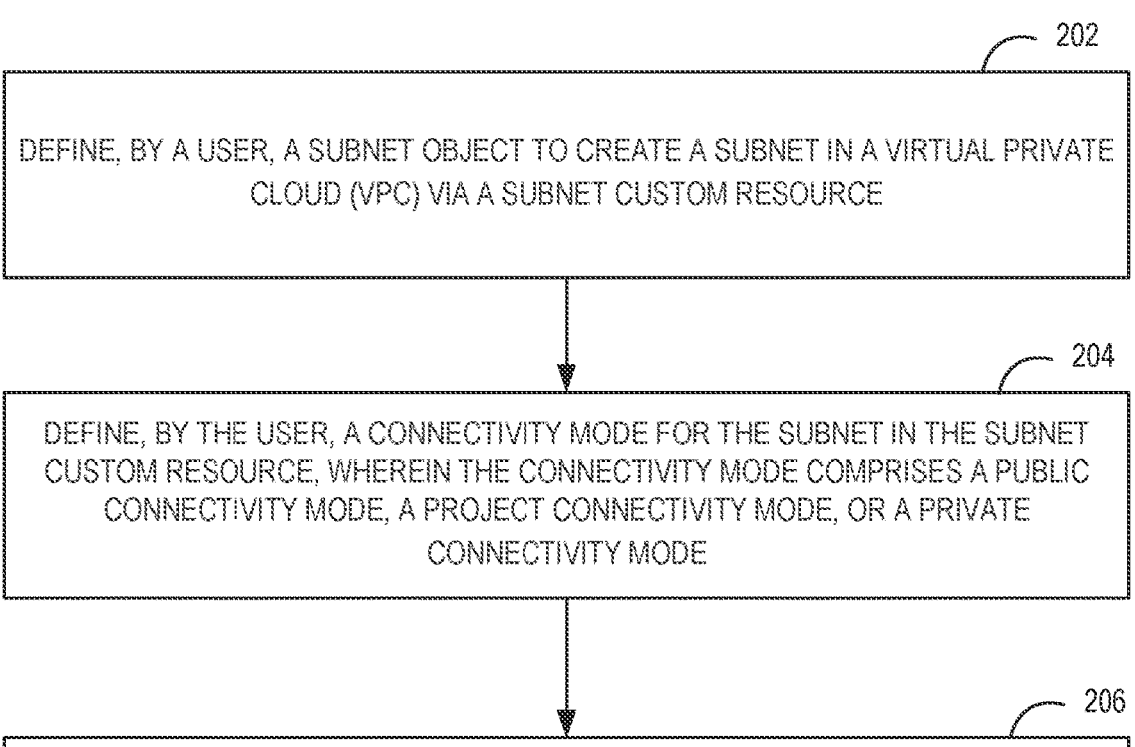

202

DEFINE, BY A USER, A SUBNET OBJECT TO CREATE A SUBNET IN A VIRTUAL PRIVATE CLOUD (VPC) VIA A SUBNET CUSTOM RESOURCE

204

DEFINE, BY THE USER, A CONNECTIVITY MODE FOR THE SUBNET IN THE SUBNET CUSTOM RESOURCE, WHEREIN THE CONNECTIVITY MODE COMPRISES A PUBLIC CONNECTIVITY MODE, A PROJECT CONNECTIVITY MODE, OR A PRIVATE CONNECTIVITY MODE

206

CREATE THE SUBNET OBJECT USING THE SUBNET CUSTOM RESOURCE, WHEREIN CREATING THE SUBNET OBJECT COMPRISES ASSIGNING INTERNET PROTOCOL (IP) ADDRESSES TO THE SUBNET OBJECT FROM A PLURALITY OF PUBLIC IP ADDRESSES, A PLURALITY OF PROJECT IP ADDRESSES, OR A PLURALITY OF PRIVATE IP ADDRESSES BASED ON THE CONNECTIVITY MODE DEFINED FOR THE SUBNET

FIG. 2A

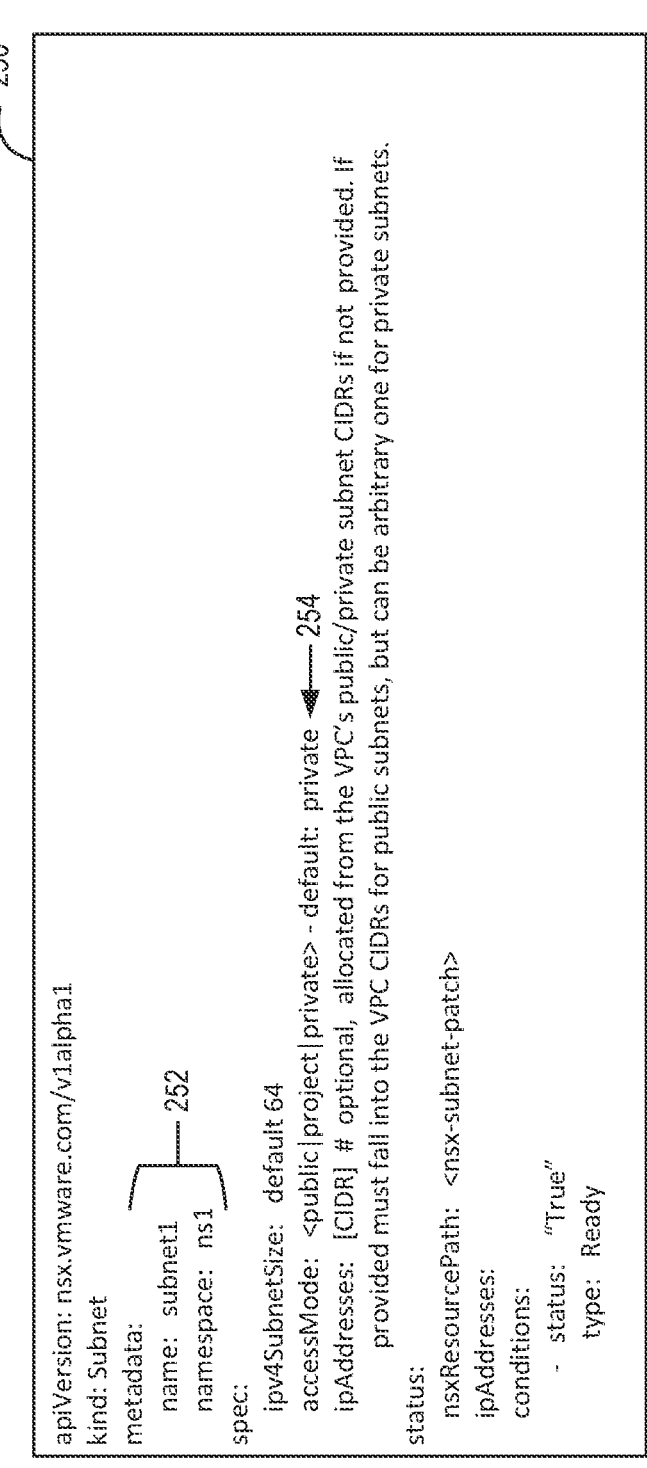

```
apiVersion: nsx.vmware.com/v1alpha1
kind: Subnet
metadata:
    name: subnet1
    namespace: ns1
spec:
    ipv4SubnetSize: default 64
    accessMode: <public|project|private> - default: private
    ipAddresses: [CIDR] # optional, allocated from the VPC's public/private subnet CIDRs if not provided. If
        provided must fall into the VPC CIDRs for public subnets, but can be arbitrary one for private subnets.
status:
    nsxResourcePath: <nsx-subnet-patch>
    ipAddresses:
    conditions:
        - status: "True"
          type: Ready
```

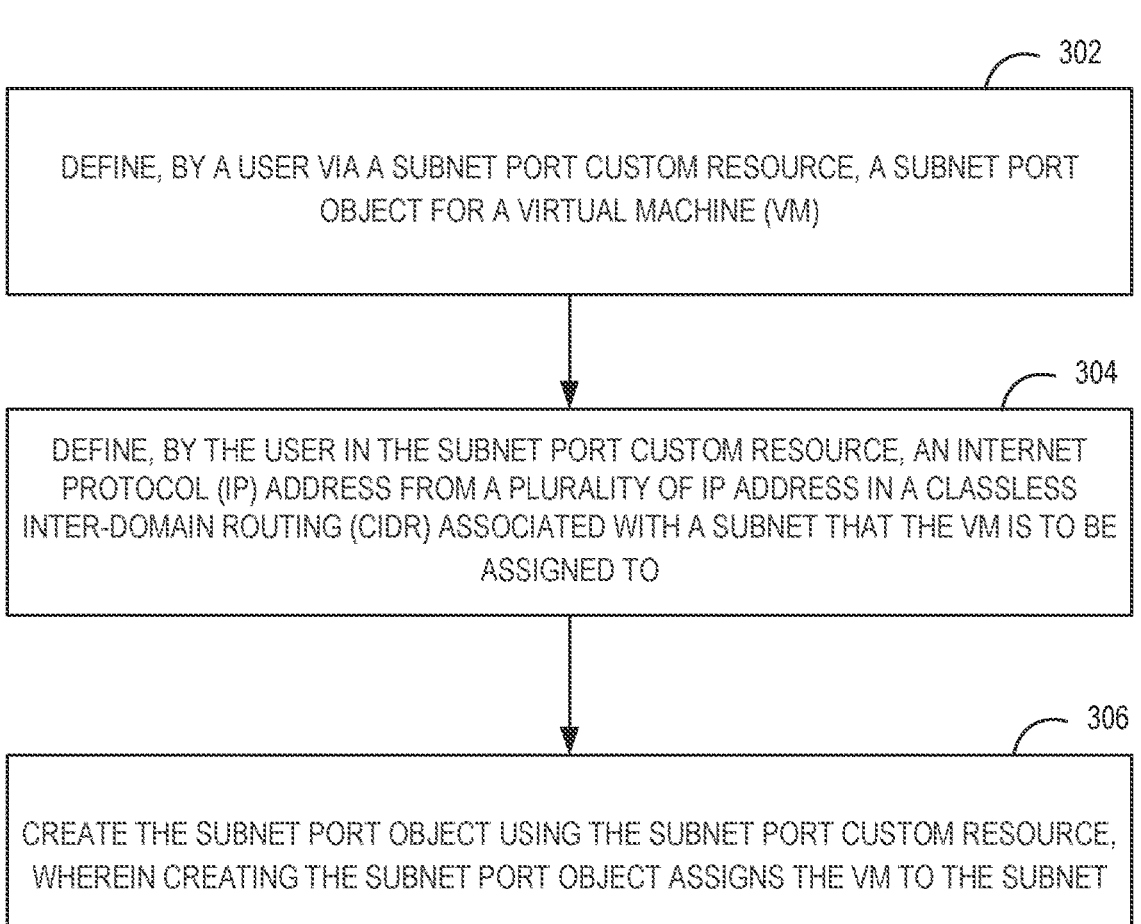

302

DEFINE, BY A USER VIA A SUBNET PORT CUSTOM RESOURCE, A SUBNET PORT OBJECT FOR A VIRTUAL MACHINE (VM)

304

DEFINE, BY THE USER IN THE SUBNET PORT CUSTOM RESOURCE, AN INTERNET PROTOCOL (IP) ADDRESS FROM A PLURALITY OF IP ADDRESS IN A CLASSLESS INTER-DOMAIN ROUTING (CIDR) ASSOCIATED WITH A SUBNET THAT THE VM IS TO BE ASSIGNED TO

306

CREATE THE SUBNET PORT OBJECT USING THE SUBNET PORT CUSTOM RESOURCE, WHEREIN CREATING THE SUBNET PORT OBJECT ASSIGNS THE VM TO THE SUBNET

FIG. 3A

MULTIPLE CONNECTIVITY MODES FOR CONTAINERIZED WORKLOADS IN A MULTI-TENANT NETWORK

Modern applications are applications designed to take advantage of the benefits of modern computing platforms and infrastructure. For example, modern applications can be deployed in a multi-cloud or hybrid cloud fashion. A multi-cloud application may be deployed across multiple clouds, which may be multiple public clouds provided by different cloud providers or the same cloud provider or a mix of public and private clouds. The term, "private cloud" refers to one or more on-premises data centers that might have pooled resources allocated in a cloud-like manner. Hybrid cloud refers specifically a combination of public cloud and private clouds. Thus, an application deployed across a hybrid cloud environment consumes both cloud services executing in a public cloud and local services executing in a private data center (e.g., a private cloud). Within the public cloud or private data center, modern applications can be deployed onto one or more virtual machines (VMs), containers, application services, and/or the like.

A container is a package that relies on virtual isolation to deploy and run applications that depend on a shared operating system (OS) kernel. Containerized applications, also referred to as containerized workloads, can include a collection of one or more related applications packaged into one or more containers. In some orchestration platforms, a set of one or more related containers sharing storage and network resources, referred to as a pod, may be deployed as a unit of computing software. Container orchestration platforms automate the lifecycle of containers, including such operations as provisioning, deployment, monitoring, scaling (up and down), networking, and load balancing.

Kubernetes® (K8S®) software is an example open-source container orchestration platform that automates the deployment and operation of such containerized workloads. In particular, Kubernetes may be used to create a cluster of interconnected nodes, including (1) one or more worker nodes that run the containerized workloads (e.g., in a worker plane) and (2) one or more control plane nodes (e.g., in a control plane) having control plane components running thereon that control the cluster. Control plane components make global decisions about the cluster (e.g., scheduling), and can detect and respond to cluster events (e.g., starting up a new pod when a workload deployment's intended replication is unsatisfied). As used herein, a node may be a physical machine, or a VM configured to run on a physical machine running a hypervisor.

In some cases, multiple tenants (e.g., users or customers) run containerized workloads in the same networking environment, such as in a public cloud. For security purposes, the containerized workloads of different tenants may need to be network isolated from one another within the networking environment. Further, a tenant may be divided into a number of sub-tenants, such that certain containerized workloads of different sub-tenants of a given tenant may also need to be network isolated from one another within the networking environment.

SUMMARY

One or more embodiments provide a method for isolated environments for containerized workloads within a virtual private cloud in a networking environment. The method generally includes defining, by a user, a subnet custom resource object for creating a subnet in the virtual private cloud. Defining the subnet custom resource object includes defining a connectivity mode for the subnet. The connectivity mode determines whether internet protocol (IP) addresses associated with the subnet are addressable within the virtual private cloud, within a first level isolation construct that includes the virtual private cloud, or within a second level isolation construct that includes the virtual private cloud and the first level isolation construct. The method further includes deploying the subnet custom resource object such that the subnet is created in the virtual private cloud with the connectivity mode specified for the subnet. The method further includes defining, by the user, a subnet port custom resource object for assigning a node to the subnet. One or more containerized workloads are running on the node. The method further includes deploying the subnet port custom resource object such that the node is assigned to the subnet.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

FIG. 1A depicts example physical and virtual network components in a networking environment in which embodiments of the present disclosure may be implemented

FIG. 2A illustrates example operations for creating a subnet in a virtual private cloud (VPC), according to an example embodiment of the present disclosure.

FIG. 2B illustrates an example subnet custom resource template used to create a subnet object for a Kubernetes deployment, according to an example embodiment of the present disclosure.

FIG. 3A illustrates example operations for assigning a workload to a subnet of a VPC, according to an example embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1B:
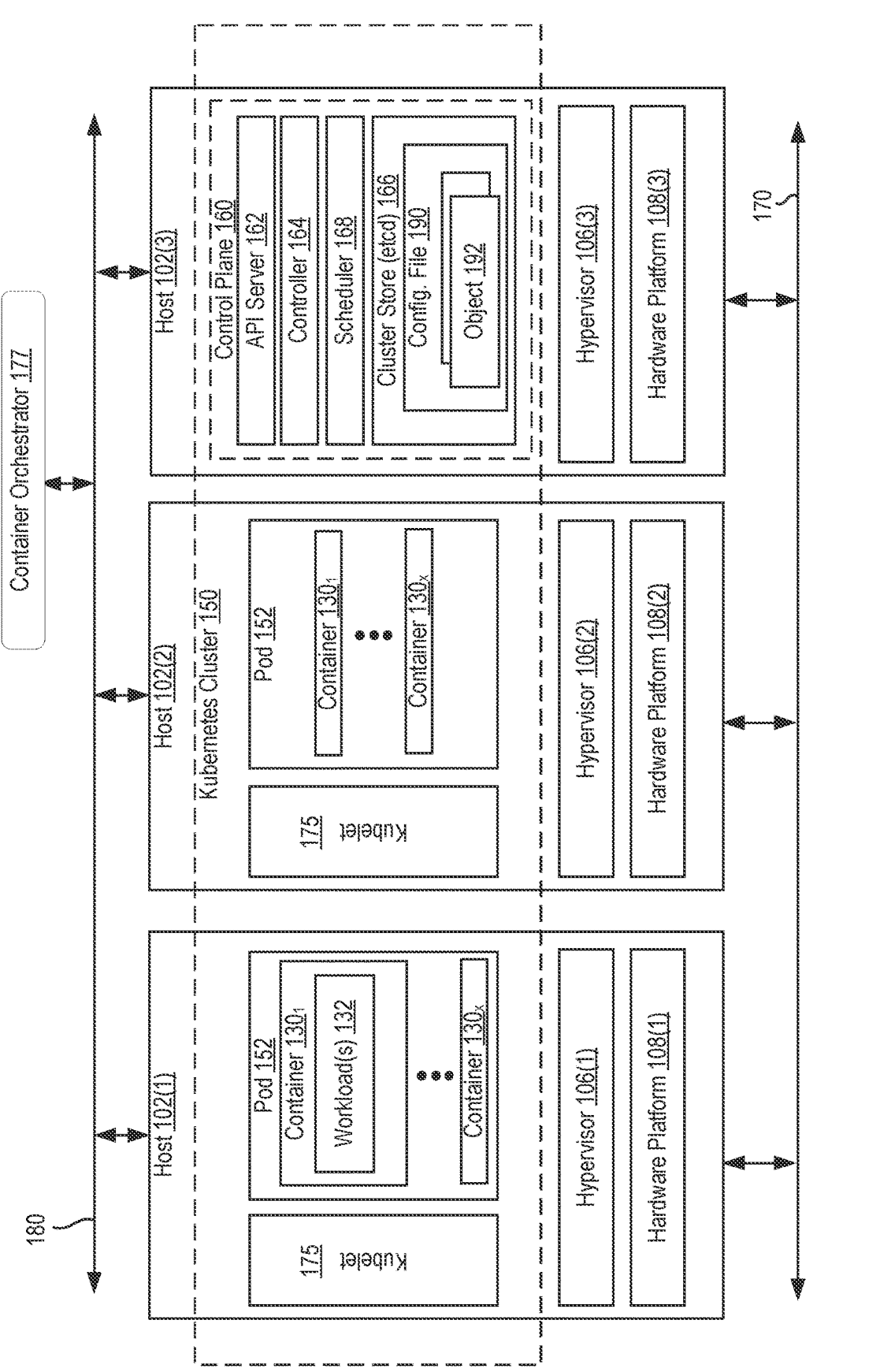
FIG. 1B illustrates an example cluster for running containerized workloads in the network environment of FIG. 1A, according to an example embodiment of the present disclosure.

Techniques for providing multiple connectivity modes for containerized workloads in a multi-tenant networking environment are described herein. Certain aspects herein provide hierarchical isolation constructs to network isolate nodes running the containerized workloads. In certain aspects, the isolation constructs include organizations (orgs), projects, and virtual private clouds (VPCs). In particular, an organization includes one or more projects, and a project includes one or more VPCs. An org may be associated with a particular tenant, such that different tenants are associated with different orgs. Further, a project may be associated with a sub-tenant of the tenant associated with the org that includes the project, such that different sub-tenants are associated with different projects. A VPC is a logically isolated section of the multi-tenant networking environment.

In certain aspects, different connectivity mode subnets are created for each VPC. A subnet, or subnetwork, is a logical partition of an internet protocol (IP) network. In certain aspects, nodes that belong to the subnet are assigned IP addresses from a given classless inter-domain routing (CIDR) block associated with the subnet. The IP addresses may be IP addresses of a physical network to which the nodes are coupled, or of a logical network to which the nodes are coupled. The nodes of a given subnet may share the same connectivity, security, and availability requirements. Example connectivity mode subnets may include a private connectivity mode subnet (also referred to as a private subnet), a project connectivity mode subnet (also referred to as a project subnet), or a public connectivity mode subnet (also referred to as a public subnet).

Nodes assigned to the private connectivity mode subnet are assigned IP addresses from a private IP CIDR block associated with the private connectivity mode subnet. Each IP address of the private IP CIDR block is guaranteed unique only within the VPC itself, and not across VPCs. Therefore, a node assigned to the private connectivity mode subnet is only directly addressable by its assigned IP address from the private IP CIDR block within the VPC itself. For the node to be addressable outside the VPC, network address translation (NAT) must be used.

Nodes assigned to the project connectivity mode subnet are assigned IP addresses from a project IP CIDR block associated with the project connectivity mode subnet. Each IP address of the project IP CIDR block is guaranteed unique across all VPCs within the project itself, and not across projects. Therefore, a node assigned to the project connectivity mode subnet is only directly addressable by its assigned IP address from the project IP CIDR block within the project itself. For the node to be addressable outside the project, NAT must be used.

Nodes assigned to the public connectivity mode subnet are assigned IP addresses from a public IP CIDR block associated with the public connectivity mode subnet. Each IP address of the public IP CIDR block is guaranteed unique across all VPCs within the org. Therefore, a node assigned to the public connectivity mode subnet is directly addressable by its assigned IP address from the public IP CIDR block within the org itself. For the node to be addressable outside the org, NAT must be used. Each connectivity mode subnet, therefore, provides a different level of network isolation, namely at the VPC level, project level, or org level.

To create the different connectivity mode subnets described above, as well as assign nodes (and accordingly containerized workloads running on the nodes) to each of these subnets, embodiments herein provide two new custom resource definition (CRD) objects (also referred to herein as "custom resources"). In particular, a Kubernetes platform is made up of a central database containing Kubernetes objects, or persistent entities, that are managed in the platform. Kubernetes objects are represented in configuration files, such as JavaScript Object Notation (JSON) or YAML files, and describe the intended state of a Kubernetes cluster of interconnected nodes used to run containerized workloads. A Kubernetes object is a "record of intent"— once an object is created, the Kubernetes system will constantly work to ensure that object is realized in the deployment. One type of Kubernetes objects is a CRD object that extends the Kubernetes application programming interface (API) (e.g., a resource-based (e.g., RESTful or representational state transfer architectural style) programmatic interface provided via HTTP) or allows a user to introduce their own API into a Kubernetes cluster. In particular, Kubernetes provides a standard extension mechanism, referred to as custom resource definitions, that enables extension of the set of resources and objects that can be managed in a Kubernetes cluster.

A first custom resource provided herein includes a subnet custom resource. The subnet custom resource allows a user to define a subnet object for a Kubernetes cluster, and a connectivity mode for the subnet. The subject object, when deployed, causes the cluster manager to create a subnet of the specified connectivity mode in a VPC.

A second custom resource provided herein includes a subnet port custom resource. The subnet port custom resource allows a user to define a subnet port object for a node, such as a VM. The subnet port object may be generated to associate the node, and containerized workloads running therein, with a particular subnet.

As such, techniques described herein provide a solution for creating isolated environments, e.g., subnets having different connectivity modes, within a VPC for different nodes and their containerized applications/workloads. The different connectivity modes allow for flexible configuration of different levels of network isolation for the nodes, allowing configurable levels of network security for different nodes.

FIG. 1A depicts example physical and virtual network components in a networking environment 100 in which embodiments of the present disclosure may be implemented. Networking environment 100 includes a data center 101. Data center 101 includes one or more hosts 102, a management network 180, a data network 170, and a container orchestrator 177.

Host(s) 102 may be communicatively connected to management network 180 and data network 170. Data network 170 and management network 180 enables communication between hosts 102, and/or between other components and hosts 102.

Data network 170 and management network 180 may be separate physical networks or may be logically isolated using a single physical network and separate VLANs or logical overlay networks, or a combination thereof. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 102 may be geographically co-located servers on the same rack or on different racks in any arbitrary location in the data center. Host(s) 102 may be in a single host cluster or logically divided into a plurality of host clusters. Each host 102 may be configured to provide a virtualization layer, also referred to as a hypervisor 106, that abstracts processor, memory, storage, and networking resources of a hardware platform 108 of each host 102 into multiple VMs $104_1$ to $104_N$ (collectively referred to as VMs 104 and individually referred to as VM 104) that run concurrently on the same host 102.

Host(s) 102 may be constructed on a server grade hardware platform 108, such as an x86 architecture platform.

Hardware platform 108 of each host 102 includes components of a computing device such as one or more processors (central processing units (CPUs)) 116, memory (random access memory (RAM)) 118, one or more network interfaces (e.g., physical network interfaces (PNICs) 120), storage 112, and other components (not shown). CPU 116 is configured to execute instructions that may be stored in memory 118, and optionally in storage 112. The network interface(s) enable hosts 102 to communicate with other devices via a physical network, such as management network 180 and data network 170.

In certain aspects, hypervisor 106 runs in conjunction with an operating system (not shown) in host 102. In some embodiments, hypervisor 106 can be installed as system level software directly on hardware platform 108 of host 102 (often referred to as "bare metal" installation) and be conceptually interposed between the physical hardware and the guest operating systems executing in the VMs 104. It is noted that the term "operating system," as used herein, may refer to a hypervisor.

Each of VMs 104 running on each host 102 may include virtual interfaces, often referred to as virtual network interfaces (VNICs), such as VNICs 140, which are responsible for exchanging packets between VMs 104 and hypervisor 106, such as with a virtual switch 142 running in the hypervisor 106. The virtual switch on each host operates as a managed edge switch implemented in software by a hypervisor on each host. Virtual switches provide packet forwarding and networking capabilities to VMs running on the host. VNICs 140 can connect to Vports 144, provided by virtual switch 142. In this context "connect to" refers to the capability of conveying network traffic, such as individual network packets, or packet descriptors, pointers, identifiers, etc., between components so as to effectuate a virtual datapath between software components. Virtual switch 142 also has Vport(s) 146 connected to PNIC(s) 120, such as to allow VMs 104 (and containers 130 running in VMs 104, as described below) to communicate with virtual or physical computing devices outside of host 102 via data network 170 and/or management network 180.

Further, each of VMs 104 implements a virtual hardware platform that supports the installation of a guest OS 134 which is capable of executing one or more applications. Guest OS 134 may be a standard, commodity operating system. Examples of a guest OS include Microsoft Windows, Linux, and/or the like.

In certain embodiments, each VM 104 includes a container engine 136 installed therein and running as a guest application under control of guest OS 134. Container engine 136 is a process that enables the deployment and management of virtual instances (referred to herein as "containers") in conjunction with OS-level virtualization on guest OS 134 within VM 104 and the container orchestration platform. Containers 130 provide isolation for user-space processes executing within them. Containers 130 encapsulate an application (and its associated workloads 132) as a single executable package of software that bundles application code together with all of the related configuration files, libraries, and dependencies required for it to run. The application may be any software program, such as a word processing program or a database server.

In certain embodiments, data center 101 can include a container orchestrator 177. Container orchestrator 177 implements an orchestration control plane, such as a Kubernetes control plane, to deploy and manage applications and/or services thereof on hosts 102, of a host cluster 110, using containers 130. For example, Kubernetes may deploy containerized applications as containers 130 and a control plane on a cluster of hosts 102. The control plane, for each cluster of hosts, manages the computation, storage, and memory resources to run containers 130. Further, the control plane may support the deployment and management of applications (or services) on the cluster using containers 130. In some cases, the control plane deploys applications as pods of containers running on hosts 102, either within VMs 104 or directly on an OS of the host. A pod is a group of one or more containers and a specification for how to run the containers. A pod may be the smallest deployable unit of computing that can be created and managed by container orchestrator 177. An example container-based cluster for running containerized workloads is illustrated in FIG. 1B. While the example container-based cluster shown in FIG. 1B is a Kubernetes cluster 150, in other examples, the container-based cluster may be another type of container-based cluster based on container technology, such as Docker Swarm clusters.

As illustrated in FIG. 1B, Kubernetes cluster 150 is formed from a combination of one or more pods 152 including one or more containers 130, one or more kubelets 175, and a control plane 160 running on one or more nodes. As described above, a node may be a physical machine, such as a host 102, or a VM 104 (not shown in FIG. 1B) configured to run on a host 102 running a hypervisor 106. The nodes may be a combination of worker nodes (e.g., running pods 152, containers 130, and kubelets 175) and control plane nodes (e.g., running components of control plane 160). For the example Kubernetes cluster 150, the nodes may be hosts 102, and more specifically, hosts 102(1) and 102(2) may be worker nodes while host 102(3) may be a control plane node.

Further, although not illustrated in FIG. 1B, Kubernetes cluster 150 may include one or more kube proxies. A kube proxy is a network proxy that runs on each host 102 in Kubernetes cluster 150 that is used to maintain network rules. These network rules allow for network communication with pods 152 from network sessions inside and/or outside of Kubernetes cluster 150.

Kubelet 175 is an agent that helps to ensure that one or more pods 152 run on each node according to a defined state for the pods 152, such as defined in a configuration file. Each pod 152 may include one or more containers 130.

Control plane 160 includes components such as an API server 162, a cluster store (etcd) 166, a controller 164, and a scheduler 168. Control plane 160's components make global decisions about Kubernetes cluster 150 (e.g., scheduling), as well as detect and respond to cluster events. Control plane 160 manages and controls every component of Kubernetes cluster 150. Control plane 160 handles most, if not all, operations within Kubernetes cluster 150, and its components define and control Kubernetes cluster 150's configuration and state data. Control plane 160 configures and runs the deployment, management, and maintenance of the containerized workloads 132. As such, ensuring high availability of the control plane 160 is important for container deployment and management.

API server 162 operates as a gateway to Kubernetes cluster 150. As such, a command line interface, web user interface, users, and/or services communicate with Kubernetes cluster 150 through API server 162. One example of a Kubernetes API server 162 is kube-apiserver. Instances of kube-apiserver are designed to scale horizontally—that is, this component scales by deploying more instances. Several instances of kube-apiserver may be run, and traffic may be balanced between those instances.

Controller 164 is a control plane 160 component that runs and manages controller processes in Kubernetes cluster 150. For example, control plane 160 may have (e.g., four) control loops called controller processes, that watch the state of Kubernetes cluster 150 and try to modify the current state of Kubernetes cluster 150 to match an intended state of Kubernetes cluster 150. In certain aspects, controller processes of controller 164 are configured to monitor for changes to the state of Kubernetes cluster 150.

Scheduler 168 is a control plane 160 component configured to allocate new pods 152 to hosts 102. Additionally, scheduler 168 may be configured to distribute workloads, across containers 130, pods 152, and/or nodes (e.g., in some cases, hosts 102) that are assigned to use resources of hardware platform 108. Resources may refer to processor resources, memory resources, networking resources, and/or the like. In some cases, scheduler 168 may schedule newly created containers 130 to one or more of the nodes in Kubernetes cluster 150.

Cluster store (etcd) 166 is a data store, such as a consistent and highly-available key value store, used as a backing store for Kubernetes cluster 150 data. In certain aspects, cluster store (etcd) 166 stores configuration file(s) 190 made up of one or more manifests that declare intended system infrastructure and workloads 132 to be deployed in Kubernetes cluster 150. Kubernetes objects 192 can be created, updated and deleted based on configuration file(s) 190 to represent the state of Kubernetes cluster 150.

As described above, these objects may be CRD objects, such as subnet objects and/or subnet port objects, created specifically for Kubernetes cluster 150. The subnet objects may be used to create subnets. A connectivity mode may be specified for each subnet object created for Kubernetes cluster 150. Additionally, the subnet port objects may be created to assign one or more workloads 132 to each of the created subnets. For example, a subnet port object may specify a VM 104, running a workload 132, in Kubernetes cluster 150 that is to be associated with a particular subnet.

FIG. 2A illustrates example operations 200 for creating a subnet for Kubernetes cluster 150. Kubernetes cluster 150 may be a multi-tenant cluster shared among multiple tenants. In the shared infrastructure, isolated networking and security topologies may be provisioned for each of the different tenants. For example, orgs, projects, VPCs, and subnets may be implemented to provide basic isolation capabilities for networking and security among the tenants, their sub-tenants, and workloads 132 in Kubernetes cluster 150.

Operations 200 begin, at operation 202, by defining a subnet object to create a subnet in a VPC. The subnet object is defined by a user via a subnet custom resource (e.g., a configuration file). Defining a subnet object may be accomplished in various ways. For example, in certain embodiments, defining the subnet object includes identifying and/or specifying different attributes (e.g., including a connectivity mode, as described in operation 204) of the subnet that is to be created in the VPC, for example, defining such attributes in a configuration file. As another example, in certain embodiments, defining the subnet object includes selecting a pre-existing subnet object, with its attributes defined. For example, a user may select a pre-existing subnet object via a graphical user interface (GUI).

Operations 200 proceed, at operation 204, by specifying a connectivity mode for the subnet in the subnet custom resource. The specified connectivity mode may be a public connectivity mode, a project connectivity mode, or a private connectivity mode.

Operations 200 proceed, at operation 206, by creating the subnet object using the subnet custom resource. Creation of the subnet object includes assigning IP addresses to the subnet object from a plurality of public IP addresses, a plurality of project IP addresses, or a plurality of private IP addresses based on the connectivity mode specified for the subnet in the subnet custom resource. Once the subnet object is created, the system will work to ensure that the subnet defined by the subnet object is realized in the deployment.

FIG. 2B illustrates an example subnet custom resource template 250 used to create a subnet object for Kubernetes cluster 150 in operations 200. As illustrated at 252, example subnet custom resource template 250 includes fields for specifying name, for example, "subnet1," and a namespace, for example, "ns1," for the subnet. Further, subnet custom resource template 250 may include a field, "accessMode," for specifying a connectivity mode of the subnet. The subnet may be created with a public, project, or private connectivity mode as illustrated by "accessMode: <public|project|private>" at 254. In some cases, IP addresses to be assigned to the subnet may be specified by a user in subnet custom resource template 250. In cases where a user does not specify the IP addresses, IP addresses from a plurality of public IP addresses, a plurality of project IP addresses, or a plurality of private IP addresses are allocated to the subnet object based on the "accessMode" indicated in subnet custom resource template 250.

In certain embodiments, multiple subnet custom resources are created having same or different "accessModes" (e.g., connectivity modes) to create multiple subnets with various connectivity modes for Kubernetes cluster 150.

After the creation of one or more subnets using the subnet custom resources, (e.g., based on example fields in subnet custom resource template 250 illustrated in FIG. 2B), subnet port custom resources may be used to assign one or more VMs 104/workloads 132 to each of these created subnets.

FIG. 3A illustrates example operations 300 for assigning a workload 132 in Kubernetes cluster 150 to a subnet of a VPC.

Operations 300 begin, at operation 302, by defining a subnet port object for a VM 104 to assign the VM 104 to a subnet. The subnet port object is defined by a user via a subnet port custom resource (e.g., a configuration file). Defining a subnet port object may be accomplished in various ways. For example, in certain embodiments, defining the subnet port object includes identifying and/or specifying different attributes of the subnet port object, for example, defining such attributes in a configuration file. As another example, in certain embodiments, defining the subnet port object includes selecting a pre-existing subnet port object, with its attributes defined. For example, a user may select a pre-existing subnet port object via a GUI.

Operations 300 proceed, at operation 304, by defining an IP address from a plurality of IP addresses in a CIDR block associated with a subnet that the VM 104 is to be assigned to. The user specifies the IP address in the subnet port custom resource.

Operations 300 proceed, at operation 306, by creating the subnet port object using the subnet port custom resource. Creation of the subnet port object assigns the VM 104 to the intended subnet (e.g., having a public, project, or private connectivity mode) by assigning the specified IP address to the VM 104. Once the subnet port object is created, the system will work to ensure that the VM 104 that is to be assigned to the subnet defined by the subnet port object is realized in the deployment.

Figure 3B:
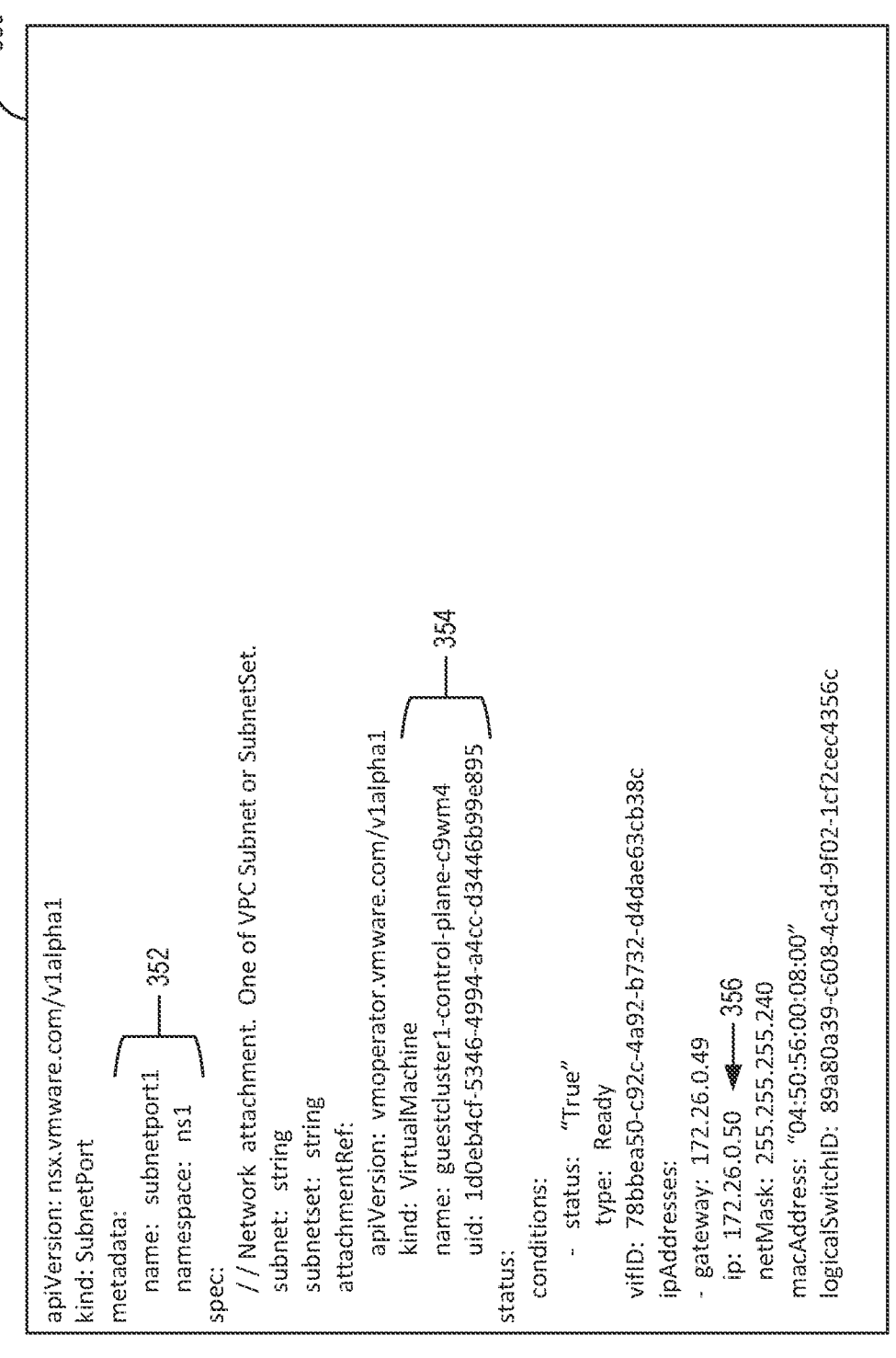
FIG. 3B illustrates an example subnet port custom resource used to create a subnet port object for a Kubernetes deployment, according to an example embodiment of the present disclosure.

FIG. 3B illustrates an example subnet port custom resource 350 used to create a subnet port object for Kubernetes cluster 150 in operations 300. As illustrated at 352, example subnet port custom resource 350 is used to create a subnet port named "subnetport1" in namespace "ns1." The subnet port may be created to assign the VM 104 with name "guestcluster 1-control-plane-c9wm4" and uid "1d0eb4cf-5346-4994-a4cc-d3446b99e895" to a particular subnet, as illustrated at 354. The subnet for which VM 104 is assigned is based on the IP address specified at 356 in subnet port custom resource 350. For example, as shown, the IP address to be assigned to VM 104 is "172.26.0.50." For this example, IP address "172.26.0.50" may be an IP address selected among a plurality of IP addresses in an IP address CIDR block associated with a project subnet (e.g., CIDR block 172.26.0.48/28). As such, based on assigning VM 104 IP address "172.26.0.50," VM 104 is assigned to the project subnet.

In certain embodiments, multiple subnet port custom resources are created to assign workloads 132 in the Kubernetes deployment to one or more subnets.

Figure 4:
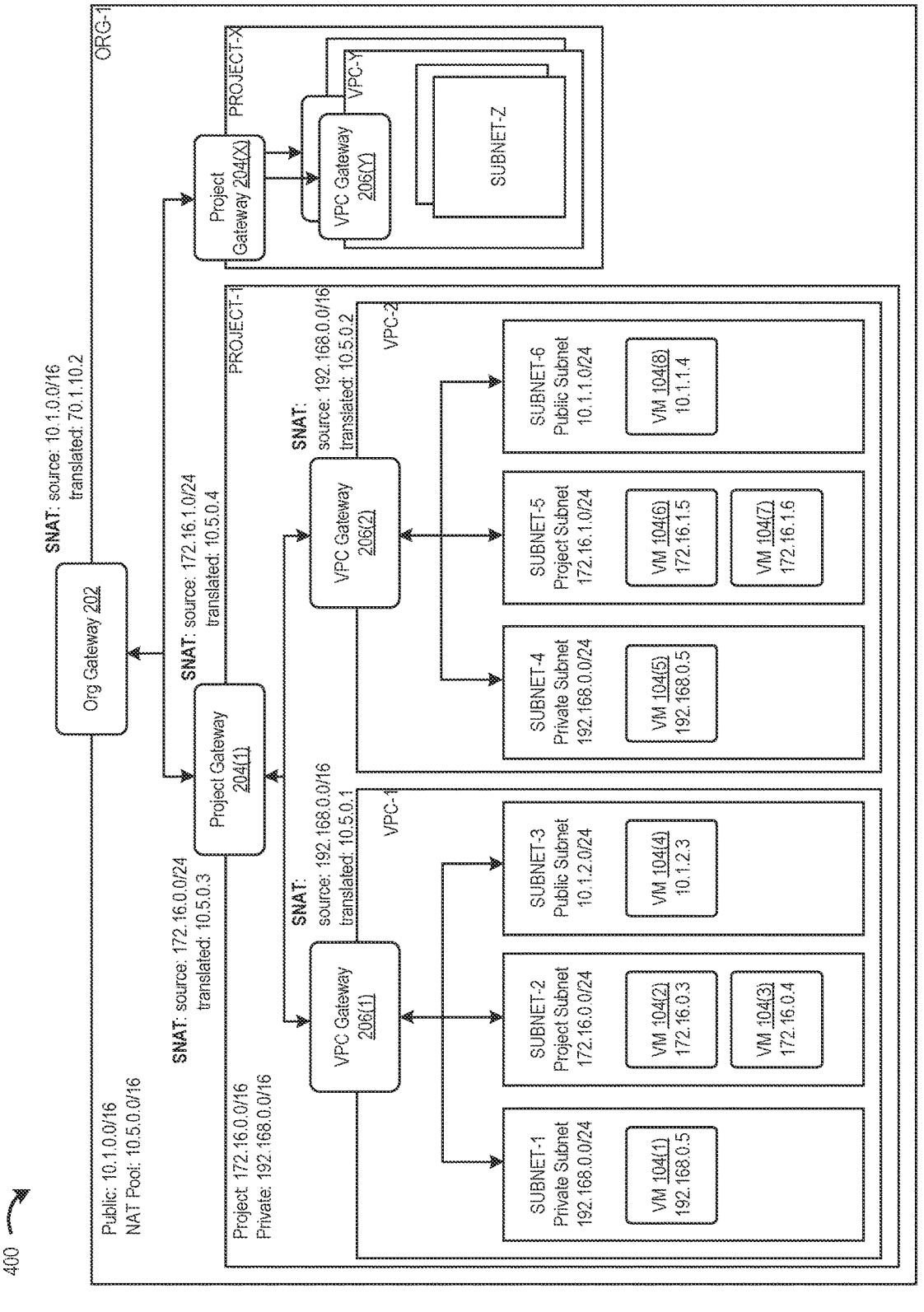
FIG. 4 illustrates example isolation constructs implemented to provide basic isolation capabilities for networking and security in multi-tenancy architecture, according to an example embodiment of the present disclosure.

FIG. 4 illustrates example isolation constructs implemented to provide basic isolation capabilities for networking and security in a multi-tenancy architecture 400. Although multi-tenancy architecture 400 only illustrates a single org corresponding to a single tenant, other orgs with similar constructs may be created for other tenants in multi-tenancy architecture 400.

As illustrated in FIG. 4, the isolation constructs implemented for networking and security isolation in multi-tenancy architecture 400 include orgs (although only one is illustrated in FIG. 4, other orgs may exist), projects, VPCs, and subnets.

The illustrated org corresponds to a single tenant in architecture 400. The org may include one or more projects (e.g., {Project-1, . . . , Project-X}). Each project is associated with a sub-tenant of a tenant corresponding to the org. Projects are created under each org to support independent sets of configurations for each tenant. Each org (shown as org-1) is associated with an org gateway 202. Each project (shown as project-1 and project-X) is associated with a project gateway 204. Further, each VPC (shown as VPC-1, VPC-2, and VPC-Y) is associated with a VPC gateway 206.

Each project is a container of VPCs. In particular, each project may include one or more VPCs, such as example Project-1 which includes { VPC-1, VPC-2} in architecture 400.

Each VPC includes one or more subnets. The number of subnets created per VPC may depend on a number of subnet objects defined (e.g., via subnet custom resources) for architecture 400. The subnets may be public subnets, project subnets, and/or private subnets. For example, VPC-1 includes subnet-1 (a private subnet), subnet-2 (a project subnet), and subnet-3 (a public subnet). VPC-2 includes subnet-4 (a private subnet), subnet-5 (a project subnet), and subnet-6 (a public subnet).

In the example architecture, IP addresses in private IP CIDR block 192.168.0.0/16 are reserved for private subnets in each given VPC of the org. For example, all IP addresses in private IP CIDR block 192.168.0.0/16 can be assigned to VMs in VPC-1, and all IP addresses in private IP CIDR block 192.168.0.0/16 can also be assigned to VMs in VPC-2, such that a VM in VPC-1 and a VM in VPC-2 can have the same IP address from private IP CIDR block 192.168.0.0/16. Each private subnet is allocated one or more IP addresses from the private IP CIDR block 192.168.0.0/16. For example, subnet-1 of VPC-1 is allocated IP addresses in CIDR block 192.168.0.0/24, which is a portion of the IP addresses in the private CIDR block 192.168.0.0/16. Further, subnet-4 of VPC-2 is also allocated IP addresses in CIDR block 192.168.0.0/24, as the same IP addresses can be assigned to VMs in different VPCs.

Further, in the example architecture, IP addresses in project IP CIDR block 172.16.0.0/16 are reserved for project subnets in each given project of the org. For example, all IP addresses in project IP CIDR block 172.16.0.0/16 can be assigned to VMs in project-1, and all IP addresses in project IP CIDR block 172.16.0.0/16 can also be assigned to VMs in project-X, such that a VM in project-1 and a VM in project-X can have the same IP address from the project IP CIDR 172.16.0.0/16. However, two VMs in the same project cannot have the same IP address from the project IP CIDR 172.16.0.0/16. For example, although VM 104(2) and VM 104(6) belong to different VPCs, both VM 104(2) and VM 104(6) belong to project-1; thus, an IP address allocated to VM 104(2) (e.g., IP address 172.16.0.3) is different than an IP address allocated to VM 104(6) (e.g., IP address 172.16.1.5). Each project subnet is allocated one or more IP addresses from the project IP CIDR block. For example, subnet-2 of VPC-1 in project-1 is allocated IP addresses in CIDR block 172.16.0.0/24, which is a portion of the IP addresses in the project IP CIDR block 172.16.0.0/16. Further, subnet-5 of VPC-2 also in project-1 is allocated IP addresses in CIDR block 172.16.1.0/24, which is a different portion of the IP addresses in the project IP CIDR block 172.16.0.0/16, such that VMs in subnet-5 are not assigned the same IP addresses as VMs in subnet-2.

IP addresses in public IP CIDR block 10.1.0.0/16 are reserved for public subnets in each given org. For example, all IP addresses in public IP CIDR block 10.1.0.0/16 can be assigned to VMs in org-1, and all IP addresses in public IP CIDR block 10.1.0.0/16 can also be assigned to VMs in another org not illustrated in FIG. 4, but part of the example multi-tenant architecture 400. Each public subnet is allocated one or more IP addresses from the public IP CIDR block. For example, subnet-3 of VPC-1 is allocated IP addresses in CIDR block 10.1.2.0/24, which is a portion of the IP addresses in the public IP CIDR block 10.1.0.0/16. Further, subnet-6 of VPC-2 is allocated IP addresses in CIDR block 10.1.1.0/24, which is another portion of the IP addresses in the public IP CIDR block 10.1.0.0/16.

As shown, each subnet includes one or more VMs 104 (1-8). The number of VMs assigned to each subnet may depend on a number of subnet port objects defined (e.g., via subnet port custom resources) for architecture 400. VMs assigned to each subnet are assigned IP addresses from an IP CIDR block of the subnet. For example, VM 104(1), assigned to private subnet-1, is assigned IP address 192.168.0.5, which is an IP address in the private IP CIDR block 192.168.0.0/24 assigned to private subnet-1.

A VM assigned to a private subnet is only directly addressable by its assigned IP address from the private IP CIDR block within the VPC itself. For the VM to be addressable outside the VPC, NAT (e.g., static NAT, dynamic NAT, port-level multiplexed NAT, overlapping NAT, etc.) is used. For example, VM 104(1) may be addressed by its private IP address when VM 104(1) is the destination of a packet sent from another VM also assigned to private subnet-1 (e.g., not shown within FIG. 4) given both VMs are within the same VPC (e.g., VPC-1). However, VM 104(1) may not be directly addressed by its private IP address when VM 104(1) is the destination of a packet sent from VM 104(5) (e.g., part of private subnet-4 of VPC-2). Instead, VPC Gateway 206(1) is configured to perform source NAT (SNAT) for egress packets sent from VMs in subnet-1 to destinations outside subnet-1, and perform destination NAT (DNAT) for ingress packets sent to VMs in subnet-1 from destinations outside subnet-1. For example, VPC Gateway 206(1) is configured to perform NAT to translate private IP addresses in the private IP CIDR block to IP address 10.5.0.1 (a public IP address in a NAT CIDR block 10.5.0.0/16 reserved for NAT in org-1). Accordingly, for VM 104(5) to send a packet to VM 104(1), VM 104(5) may include in the packet the destination IP address 10.5.0.1 and a corresponding destination port number associated with VM 104(1). Based on the destination IP address 10.5.0.1, the packet is routed to VPC gateway 206(1), which based on NAT tables, translates the destination IP address 10.5.0.1 and destination port number to destination IP address 192.168.0.5, and sends the packet with the destination IP address 192.168.0.5 to VM 104(1). Accordingly, each VPC gateway 206 is configured to perform DNAT for ingress packets with a destination address associated with the VPC gateway 206 that is in the NAT CIDR block (e.g., IP address 10.5.0.1 for VPC gateway 206(1) and IP address 10.5.0.2 for VPC gateway 206(2)) to a corresponding private IP address in a private subnet in the VPC associated with the VPC gateway 206. Further, each VPC gateway 206 is configured to perform SNAT for egress packets with a source address in a private subnet in the VPC associated with the VPC gateway 206 and a destination address outside a private subnet in the VPC associated with the VPC gateway 206.

Similarly, a VM assigned to a project subnet is only directly addressable by its assigned IP address from the project IP CIDR block within the project itself. For example, VM 104(6) assigned to project subnet-5 is directly addressable by its project IP address 172.16.1.5 by VM 104(2) also within a project subnet (e.g., project subnet-2). For a VM assigned to a project to be addressable outside the project, NAT is used. Accordingly, each project gateway 204 is configured to perform DNAT for ingress packets with a destination address associated with the project gateway 204 that is in the NAT CIDR block (e.g., IP address 10.5.0.4 for project gateway 204(1)) to a corresponding project IP address in a project subnet in the project associated with the project gateway 204. Further, each project gateway 204 is configured to perform SNAT for egress packets with a source address in a project subnet in the project associated with the project gateway 204 and a destination address outside a project subnet in the project associated with the project gateway 204.

Further, a VM assigned to a public subnet is only directly addressable by its assigned IP address from the public IP CIDR block within the org itself. For the VM to be addressable outside the org, NAT is used. For example, each org gateway 204 is configured to similarly perform NAT for the org.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method comprising:

managing, by an orchestration control plane implemented by a container orchestrator in a virtual private cloud (VPC) networking environment, a container-based cluster comprising a plurality of containers, the plurality of containers comprising a first container on a first virtual machine (VM) executing a first containerized workload, wherein the first container is managed by a first container engine running on the first VM on a first host;

providing, within the VPC networking environment, a plurality of available connectivity modes for the first workload on the first container, the plurality of available connectivity modes comprising:

a first connectivity mode in which internet protocol (IP) addresses are directly addressable only within the VPC;

a second connectivity mode in which IP addresses are directly addressable only within a first level isolation construct that includes the VPC; and a third connectivity mode in which IP addresses are directly addressable only within a second level isolation construct that includes the VPC and the first level isolation construct;

identifying a subnet custom resource definition (CRD) object specifying a selected connectivity mode to create an isolated environment for the first containerized workload;

providing an isolated environment for the first containerized workload by creating a subnet based on a subnet custom resource definition (CRD) object, wherein addressability of IP addresses within the subnet is based on the connectivity mode specified by the subnet CRD object; and assigning the first containerized workload to the subnet by deploying a subnet port CRD object that associates the subnet with the first VM.

2. The method of claim 1, wherein:

the VPC networking environment is divided into one or more second level isolation constructs, including the second level isolation construct;

each of the one or more second level isolation constructs is divided into one or more first level isolation constructs, including the first level isolation construct; and each of the one or more first level isolation constructs is divided into one or more VPCs, including the VPC.

3. The method of claim 1, wherein:

the connectivity mode specified for the subnet is the first connectivity mode;

creating the subnet in the VPC comprises assigning one or more private IP addresses in a private IP classless inter-domain routing (CIDR) block to the subnet, the one or more private IP addresses addressable within the VPC;

assigning the first VM to the subnet comprises assigning a private IP address of the one or more private IP addresses assigned to the subnet to the first VM; and the first VM is directly addressable by the private IP address within the VPC and not outside the VPC.

4. The method of claim 1, wherein:

the connectivity mode specified for the subnet is the second connectivity mode;

creating the subnet in the VPC comprises assigning one or more project IP addresses in a project IP CIDR block to the subnet, the one or more project IP addresses addressable within the first level isolation construct;

assigning the first VM to the subnet comprises assigning a project IP address of the one or more project IP addresses assigned to the subnet to the first VM; and the first VM is directly addressable by the project IP address within the first level isolation construct and not outside the first level isolation construct.

5. The method of claim 1, wherein:

the connectivity mode specified for the subnet is the third connectivity mode;

creating the subnet in the VPC with the connectivity mode specified for the subnet comprises assigning one or more public IP addresses in a public IP CIDR block to the subnet, the one or more public IP addresses addressable within the second level isolation construct;

assigning the first VM to the subnet comprises assigning a public IP address of the one or more public IP addresses assigned to the subnet to the first VM; and the first VM is directly addressable by the public IP address within the second level isolation construct and not outside the second level isolation construct.

6. The method of claim 1, further comprising performing network address translation at a first gateway associated with the VPC to translate IP addresses addressable within the VPC.

7. The method of claim 6, further comprising performing network address translation at a second gateway associated with the first level isolation construct to translate IP addresses addressable within the first level isolation construct.

8. The method of claim 7, further comprising performing network address translation at a third gateway associated with the second level isolation construct to translate IP addresses addressable within the second level isolation construct.

9. A system comprising:

one or more processors; and at least one computer-readable medium storing instructions executable by the one or more processors to perform operations comprising:

managing, by an orchestration control plane implemented by a container orchestrator in a virtual private cloud (VPC) networking environment, a container-based cluster comprising a plurality of containers, the plurality of containers comprising a first container on a first virtual machine (VM) executing a first containerized workload, wherein the first container is managed by a first container engine running on the first VM on a first host;

providing, within the VPC networking environment, a plurality of available connectivity modes for the first workload on the first container, the plurality of available connectivity modes comprising:

a first connectivity mode in which internet protocol (IP) addresses are directly addressable only within the VPC;

a second connectivity mode in which IP addresses are directly addressable only within a first level isolation construct that includes the VPC; and a third connectivity mode in which IP addresses are directly addressable only within a second level isolation construct that includes the VPC and the first level isolation construct;

identifying a subnet custom resource definition (CRD) object specifying a selected connectivity mode to create an isolated environment for the first containerized workload;

providing an isolated environment for the first containerized workload by creating a subnet based on a subnet custom resource definition (CRD) object, wherein addressability of IP addresses within the subnet is based on the connectivity mode specified by the subnet CRD object; and assigning the first containerized workload to the subnet by deploying a subnet port CRD object that associates the subnet with the first VM.

10. The system of claim 9, wherein:

the VPC networking environment is divided into one or more second level isolation constructs, including the second level isolation construct;

each of the one or more second level isolation constructs is divided into one or more first level isolation constructs, including the first level isolation construct; and each of the one or more first level isolation constructs is divided into one or more VPCs, including the VPC.

11. The system of claim 9, wherein:

the connectivity mode specified for the subnet is the first connectivity mode;

creating the subnet in the VPC comprises assigning one or more private IP addresses in a private IP classless inter-domain routing (CIDR) block to the subnet, the one or more private IP addresses addressable within the VPC;

assigning the first VM to the subnet comprises assigning a private IP address of the one or more private IP addresses assigned to the subnet to the first VM; and the first VM is directly addressable by the private IP address within the VPC and not outside the VPC.

12. The system of claim 9, wherein:

the connectivity mode specified for the subnet is the second connectivity mode;

creating the subnet in the VPC comprises assigning one or more project IP addresses in a project IP CIDR block to the subnet, the one or more project IP addresses addressable within the first level isolation construct;

assigning the first VM to the subnet comprises assigning a project IP address of the one or more project IP addresses assigned to the subnet to the first VM; and the first VM is directly addressable by the project IP address within the first level isolation construct and not outside the first level isolation construct.

13. The system of claim 9, wherein:

the connectivity mode specified for the subnet is the third connectivity mode;

creating the subnet in the VPC with the connectivity mode specified for the subnet comprises assigning one or more public IP addresses in a public IP CIDR block to the subnet, the one or more public IP addresses addressable within the second level isolation construct;

assigning the first VM to the subnet comprises assigning a public IP address of the one or more public IP addresses assigned to the subnet to the first VM; and the first VM is directly addressable by the public IP address within the second level isolation construct and not outside the second level isolation construct.

14. The system of claim 9, wherein the operations further comprise performing network address translation at a first gateway associated with the VPC to translate IP addresses addressable within the VPC.

15. The system of claim 14, wherein the operations further comprise performing network address translation at a second gateway associated with the first level isolation construct to translate IP addresses addressable within the first level isolation construct.

16. The system of claim 15, wherein the operations further comprise performing network address translation at a third gateway associated with the second level isolation construct to translate IP addresses addressable within the second level isolation construct.

17. A non-transitory computer-readable medium comprising instructions executable by one or more processors to perform operations comprising:

managing, by an orchestration control plane implemented by a container orchestrator in a virtual private cloud (VPC) networking environment, a container-based cluster comprising a plurality of containers, the plurality of containers comprising a first container on a first virtual machine (VM) executing a first containerized workload, wherein the first container is managed by a first container engine running on the first VM on a first host;

providing, within the VPC networking environment, a plurality of available connectivity modes for the first workload on the first container, the plurality of available connectivity modes comprising:

a first connectivity mode in which internet protocol (IP) addresses are directly addressable only within the VPC;

a second connectivity mode in which IP addresses are directly addressable only within a first level isolation construct that includes the VPC; and a third connectivity mode in which IP addresses are directly addressable only within a second level isolation construct that includes the VPC and the first level isolation construct;

identifying a subnet custom resource definition (CRD) object specifying a selected connectivity mode to create an isolated environment for the first containerized workload;

providing an isolated environment for the first containerized workload by creating a subnet based on a subnet custom resource definition (CRD) object, wherein addressability of IP addresses within the subnet is based on the connectivity mode specified by the subnet CRD object; and assigning the first containerized workload to the subnet by deploying a subnet port-custom resource CRD object that associates the subnet with the first VM.

18. The non-transitory computer-readable medium of claim 17, wherein:

the VPC networking environment is divided into one or more second level isolation constructs, including the second level isolation construct;

each of the one or more second level isolation constructs is divided into one or more first level isolation constructs, including the first level isolation construct; and each of the one or more first level isolation constructs is divided into one or more VPCs, including the VPC.

19. The non-transitory computer-readable medium of claim 17, wherein:

the connectivity mode specified for the subnet is the first connectivity mode;

creating the subnet in the VPC comprises assigning one or more private IP addresses in a private IP classless inter-domain routing (CIDR) block to the subnet, the one or more private IP addresses addressable within the VPC;

assigning the first VM to the subnet comprises assigning a private IP address of the one or more private IP addresses assigned to the subnet to the first VM; and the first VM is directly addressable by the private IP address within the VPC and not outside the VPC.

20. The non-transitory computer-readable medium of claim 17, wherein:

the connectivity mode specified for the subnet is the second connectivity mode;

creating the subnet in the VPC comprises assigning one or more project IP addresses in a project IP CIDR block to the subnet, the one or more project IP addresses addressable within the first level isolation construct;

assigning the first VM to the subnet comprises assigning a project IP address of the one or more project IP addresses assigned to the subnet to the first VM; and the first VM is directly addressable by the project IP address within the first level isolation construct and not outside the first level isolation construct.

* * * * *